US012102161B2

(12) United States Patent
Papadopoulos et al.

(10) Patent No.: US 12,102,161 B2
(45) Date of Patent: Oct. 1, 2024

(54) HELMET SOUND MANAGEMENT MECHANISM

(71) Applicants: George Papadopoulos, Watertown, MA (US); John M. Adams, Providence, RI (US)

(72) Inventors: George Papadopoulos, Watertown, MA (US); John M. Adams, Providence, RI (US)

( * ) Notice: Subject to any disclaimer, the term of this patent is extended or adjusted under 35 U.S.C. 154(b) by 0 days.

(21) Appl. No.: 18/417,908

(22) Filed: Jan. 19, 2024

(65) Prior Publication Data

US 2024/0251902 A1 Aug. 1, 2024

Related U.S. Application Data

(60) Provisional application No. 63/481,656, filed on Jan. 26, 2023.

(51) Int. Cl.

| | |
|---|---|
| ***A42B 3/16*** | (2006.01) |
| ***A42B 3/32*** | (2006.01) |
| ***H04R 1/02*** | (2006.01) |
| ***H04R 1/10*** | (2006.01) |

(52) U.S. Cl.

CPC .............. *A42B 3/166* (2013.01); *A42B 3/324* (2013.01); *H04R 1/028* (2013.01); *H04R 1/1008* (2013.01); *H04R 1/1083* (2013.01)

(58) Field of Classification Search

CPC ................................ A42B 3/166; A42B 3/324
USPC .............................................................. 2/243
See application file for complete search history.

(56) References Cited

U.S. PATENT DOCUMENTS

| | | | | |
|---|---|---|---|---|
| 4,700,410 A | 10/1987 | Westgate | | |
| 8,429,766 B2 | 4/2013 | Halfaker | | |
| 2013/0133128 A1* | 5/2013 | Hein | A42B 3/16 181/175 | |
| 2016/0095376 A1* | 4/2016 | Schrader | A42B 3/166 2/410 | |
| 2023/0292875 A1* | 9/2023 | Guazzerotti | A42B 3/326 2/427 | |

* cited by examiner

*Primary Examiner* — Timothy K Trieu
(74) *Attorney, Agent, or Firm* — Joseph D. Hodler

(57) ABSTRACT

A helmet features a sound management mechanism within a hard exterior shell and an interior of expanded polystyrene foam. Ear cups embedded within the shell surround the ears, with a torus-shaped soft material forming a seal against the wearer's head. The helmet allows the transition of ear cups between engaged and disengaged positions. The engaged position is against the head. The disengaged position is away from the head, allowing easy placement and removing of the helmet. Positions may be transitioned using one hand. The helmet may include lateral adjustment of ear cups, and some versions incorporate electronic audio features like noise cancellation, communication capabilities, and wireless connectivity.

20 Claims, 21 Drawing Sheets

HELMET SOUND MANAGEMENT MECHANISM

CROSS-REFERENCE TO RELATED APPLICATIONS

The present application claims the benefit of Provisional Patent Application No. 63/481,656, filed Jan. 26, 2023.

FIELD

This invention generally relates to protective helmets and the suppression of noise.

BACKGROUND

Helmets are worn by riders of recreational and professional vehicles for protection from head injury by external forces. The primary purpose of helmets is for preventing blunt force trauma, but they also may be better designed to prevent hearing discomfort and damage by blocking noise.

Motorcycle riding is a prime example. Riders are subject to ambient wind noise throughout their ride. Noise travels in through the various openings in the visor, air vents, and under the neck hole. Wind noise creates sound at decibel levels capable of causing headaches during a ride and may also cause permanent hearing loss over the course of time. Faster speeds and longer duration are exacerbating factors.

Helmet manufactures are attempting to address the issue by sealing the helmets as much as possible, adding layers of foam for sound dampening, providing tight closures around the neck, and including sound cancelling electronics. But none of these methods fully eliminates the noise.

Some riders also wear earplugs, which block sound but can be uncomfortable. Furthermore, the earplugs prevent the availability of desired audio, through a communications system, and ambient sound from the environment including other vehicles and people.

U.S. Pat. No. 8,429,766 describes a helmet with embedded ear cups, which may effectively suppress external noise. The ear cups are pressed against the head, to form a seal around the ear. This helmet may provide adequate protection from wind noise, but is uncomfortable to put on and take off, as the ear cup will push against the ears.

U.S. Pat. No. 4,700,410 also describes a helmet with an ear cup. This helmet uses an inflatable bladder torus around the rim of the cups. When the bladder is deflated, the wearer can more easily put on or remove the helmet. When the helmet is on, the bladder is inflated to create a tight seal against the head. This solves the problem of comfort when putting on or removing the helmet but includes pneumatic system prone to failure.

A new mechanism for protecting the hearing of a helmet wearer is required, that provides an easy way of engaging and disengaging the ear cup, for added comfort and protection.

SUMMARY

A helmet is equipped with a sound management mechanism. The helmet is comprised of a hard exterior shell. The interior is designed to snugly fit around the wearer's head and is comprised of expanded polystyrene foam. While the primary example of a wearer is a motorcycle rider, the helmet mechanism is versatile and intended for various helmets suited to diverse applications, such as airplane pilots, boat passengers, racecar drivers, skydivers, athletes, and construction workers, offering protection from both hazards and noise.

The helmet includes ear cups embedded within the interior of the shell. The shell is designed with additional space to accommodate the earcups and associated mechanics. These ear cups are designed to completely surround the ears, over the ear. A torus-shaped soft material cushions the ear, providing a comfortable fit and blocking sound.

The ear cups have engaged and disengaged positions. The helmet is comprised of a means for transitioning the ear cups between engaged and disengaged positions. The engaged position involves securely pressing the ear cups against the wearer's head for noise protection, while the disengaged position allows easy helmet removal or wear without rubbing the ears. The invention incorporates a double helix mechanism to move the ear cups towards and away from the head. This mechanism is comprised of two halves, each with spiral ramps. The double helix mechanism facilitates smooth and controlled transitions between engaged and disengaged positions through a dial mechanism.

A dial mechanism is connected to the double helix, allowing the wearer to rotate one half of the double helix, which moves the other half to adjust the ear cup's position. The dial mechanism is flush with the helmet's exterior, featuring two finger slots for convenient one-handed operation. It includes a detente device for locking the dial in place, in both the engaged and disengaged positions.

An alternative embodiment introduces a slider mechanism for adjusting ear cup positions, replacing the dial mechanism. A slider is located on each side of the helmet, under the shell along the jaw line, and allows the wearer to move the ear cups between engaged and disengaged positions. The slider is capable of locking in various positions along its length, ensuring a customized and secure fit for the wearer.

In some embodiments, the helmet also includes a means for adjusting the ear cups laterally along the side of the wearer's head, allowing them to move up, down, forward, and backward. This feature accommodates a wide range of head sizes and shapes.

Some embodiments of the helmet incorporate electronic audio capabilities, such as noise dampening, cancellation, and communication features. These helmets have audio inputs and outputs, processors, memory, and power sources. The power source can be a helmet-mounted battery or an external connection.

Additionally, wireless communication capabilities, including Bluetooth and WIFI, may be included. Active noise cancellation is achieved using internal microphones and speakers within the ear cups. The helmet may also support external microphones for environmental awareness and communication systems like the Sena helmet system.

BRIEF DESCRIPTION OF THE DRAWINGS

In order to describe the way the above-recited and other advantages and features of the disclosure can be obtained, a particular description of the principles briefly described above are rendered by specific embodiments illustrated in the drawings. Understanding that these drawings depict only exemplary embodiments of the disclosure and are not to be considered limiting of its scope, the principles herein are described and explained with additional specificity and detail by the accompanying drawings in which.

DETAILED DESCRIPTION

Figure 1:
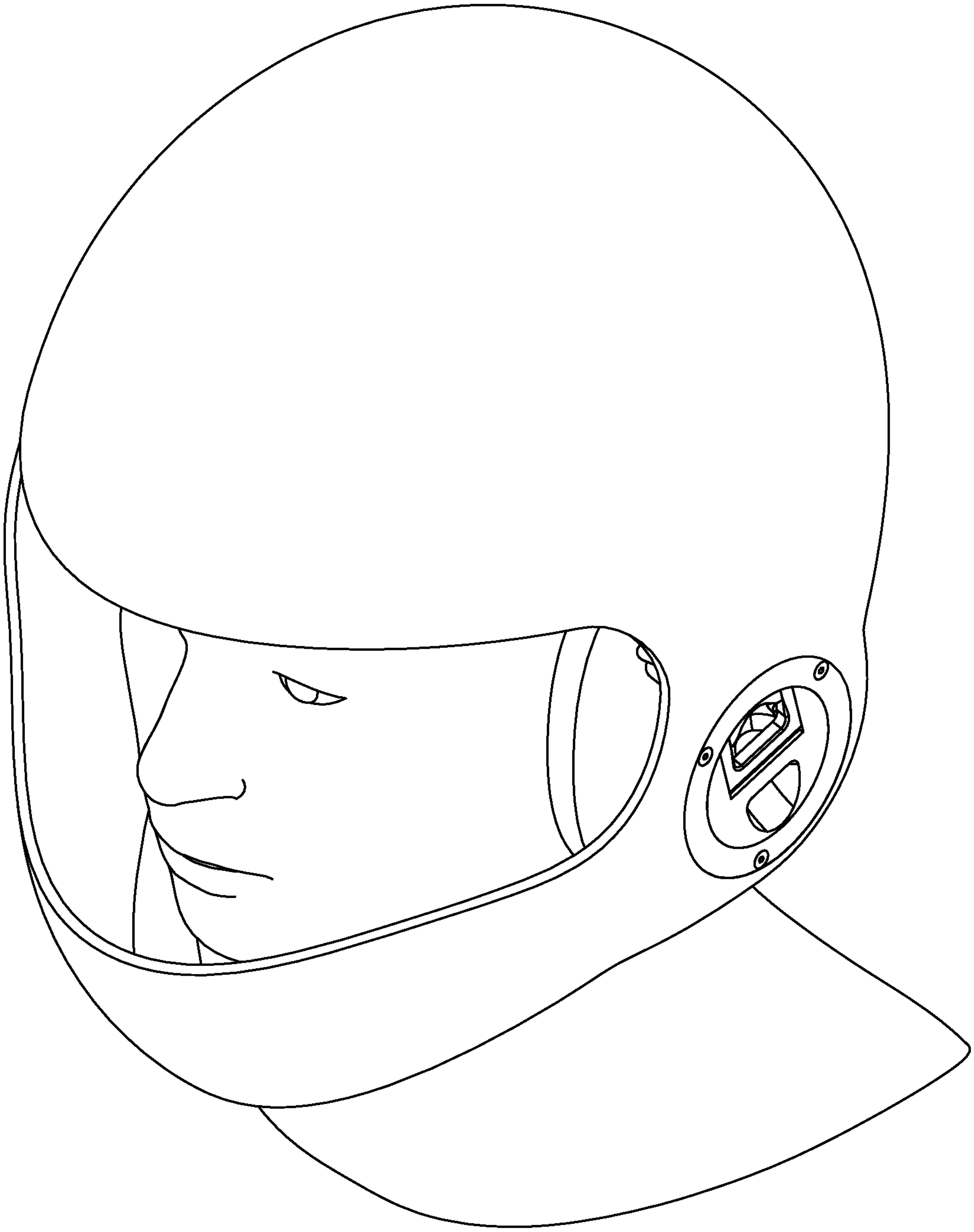
FIG. 1 is a perspective view of a helmet with interior ear cups and a dial mechanism.

A helmet is equipped with a sound management mechanism. In one embodiment, the helmet is a hard shell with interior foam padding around the head of the wearer. An example may be a typical motorcycle helmet covering the ears of the rider. See FIG. 1.

Helmet Shell

In one embodiment, the hard-shell exterior may be made of plastic, fiberglass, Kevlar, and or carbon fiber. The interior of the helmet may be made of expanded polystyrene foam. The interior is designed to fit snugly around the wearer's head.

One example of a wearer might be a motorcycle rider. Other wearers are envisioned, such as an airplane pilot, boat passenger, racecar driver, skydiver, athlete, or construction worker. The sound management mechanism is suitable for various embodiments suitable for the diverse wearers. Any application requiring protection from hazards and noise are envisioned.

Ear Cups

Figure 2:
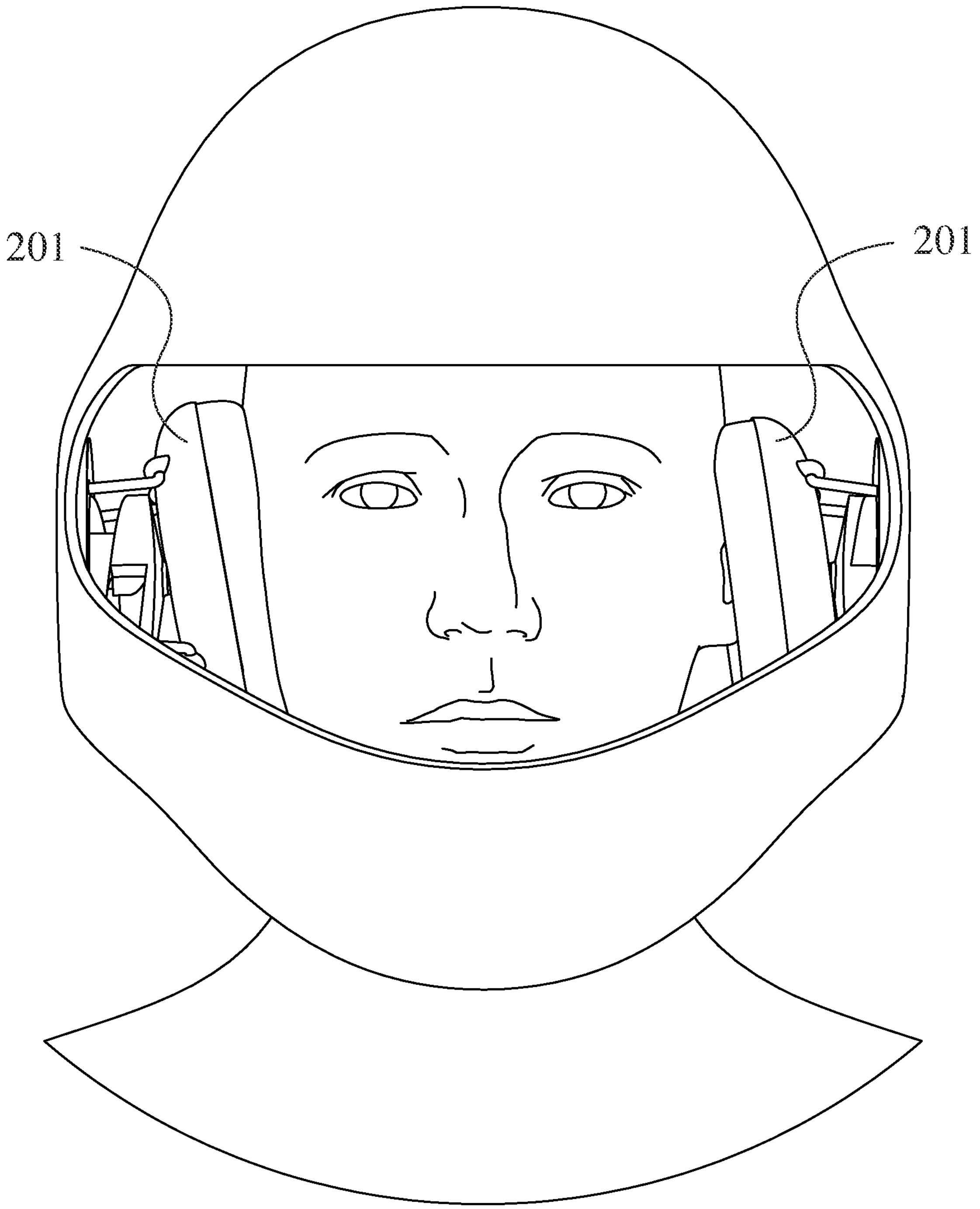
FIG. 2 is a front view of a helmet with interior ear cups and a dial mechanism.
Figure 3:
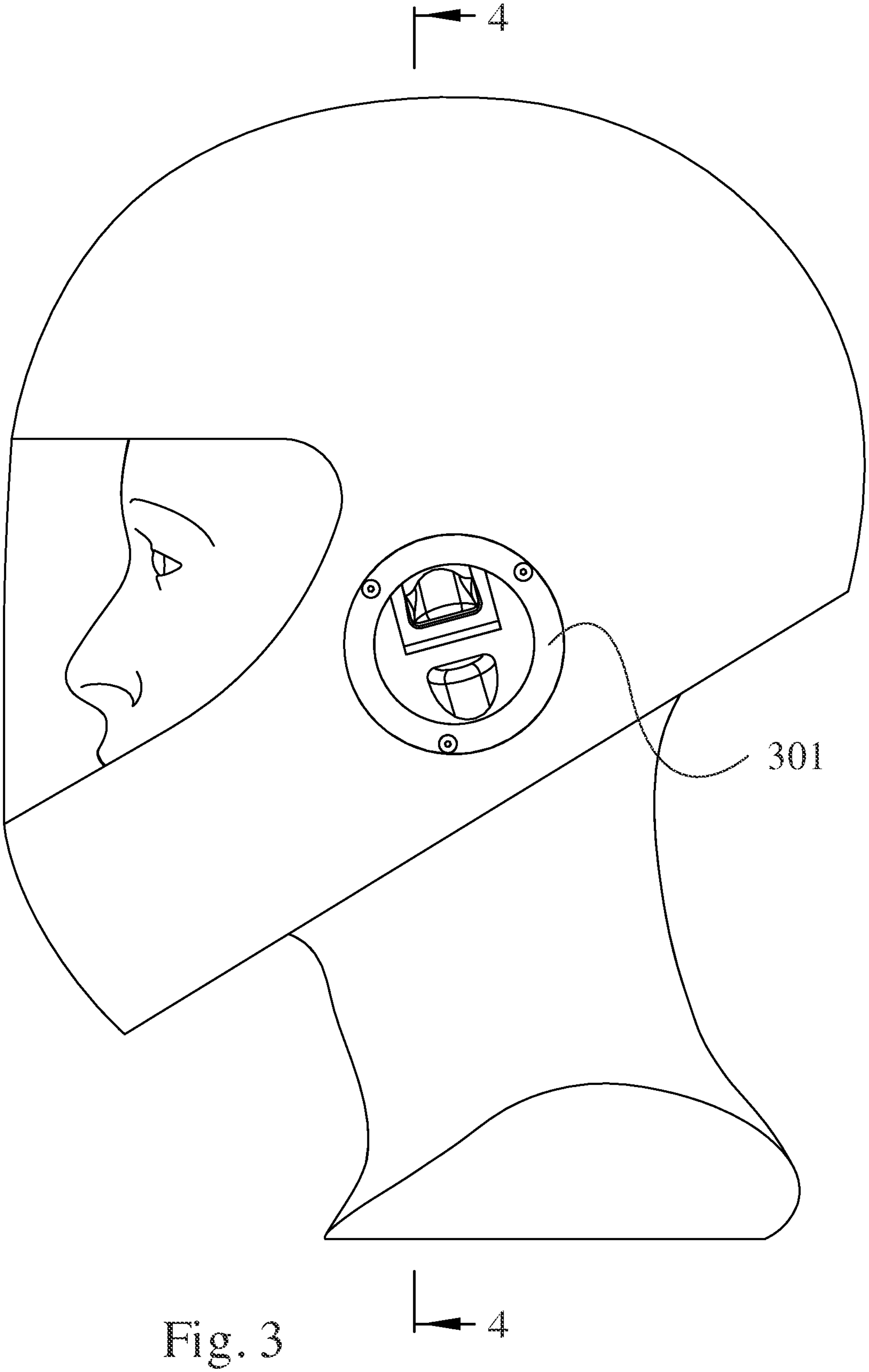
FIG. 3 is a left side view of a helmet with a dial mechanism.

The invention also is comprised of ear cups embedded in the interior of the helmet. In one embodiment, the interior foam of the helmet has cavities for insertion of the ear cups. Some embodiments may require a larger outer hard-shell exterior of the helmet, or bulbous extensions providing space for the cavities and ear cups. FIG. 2 shows a front view of the helmet, providing extra room for ear cups 201. FIG. 3 shows a side view of the helmet.

Figure 4:
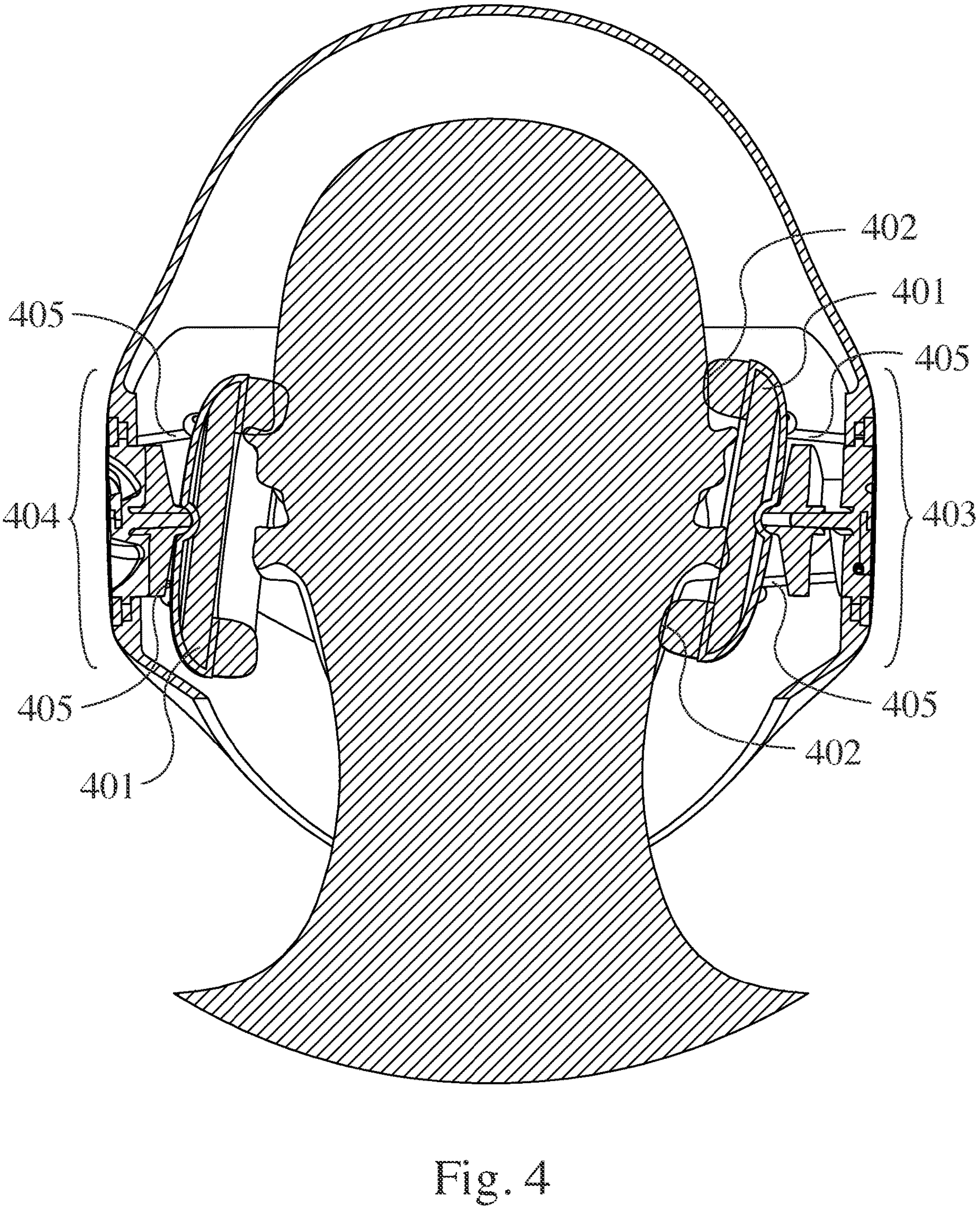
FIG. 4 is a back section cut view of a helmet with ear cups and a dial mechanism.
Figure 5:
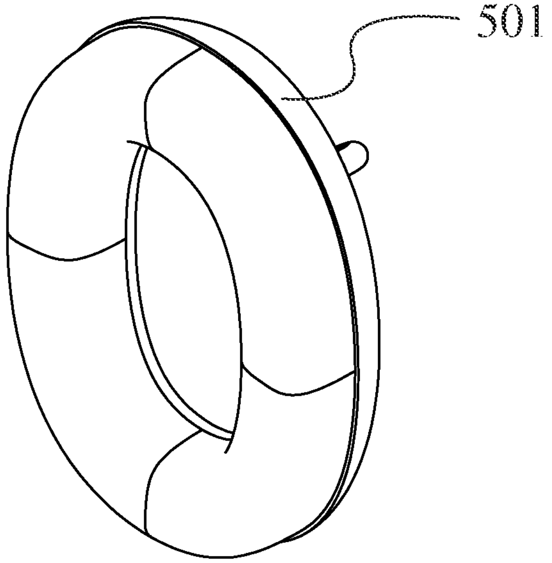
FIG. 5 is a perspective view of the interior of an ear cup.

FIG. 4 shows a back section cut of the helmet. One embodiment is comprised of two ear cups 401, for the left and right ears of the wearer. Each ear cup is comprised of an ear-shaped cup large enough to completely surround the ear. See FIG. 5 for a perspective view of an ear cup. The cup exterior 501 may be comprised of rigid plastic.

Figure 6:
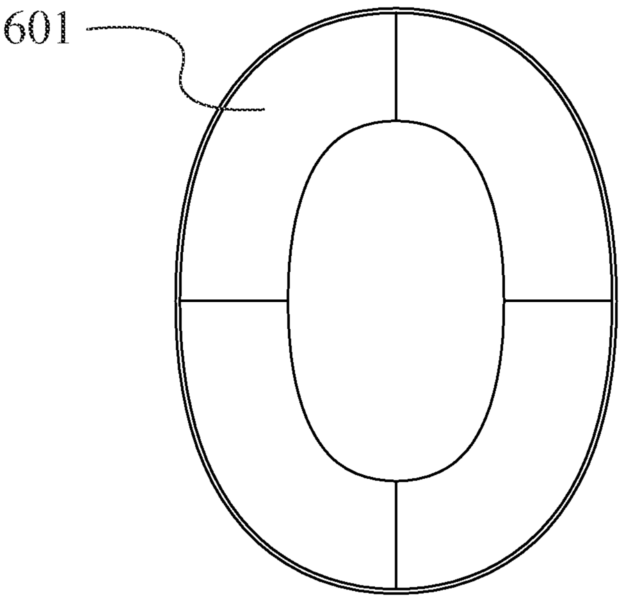
FIG. 6 is a front view of the interior of an ear cup.

FIG. 6 shows a front view of the cup. The rim 601 of the cup is comprised of a torus-shaped soft material to cushion against the ear. The torus completely surrounds the ear and presses against the head 402 of the wearer. The ear is not compressed at all, providing a comfortable fit. The torus may be comprised of acoustic foam for absorbing sound waves, and lined with a soft vinyl for creating an airtight seal against the head.

Figure 7:
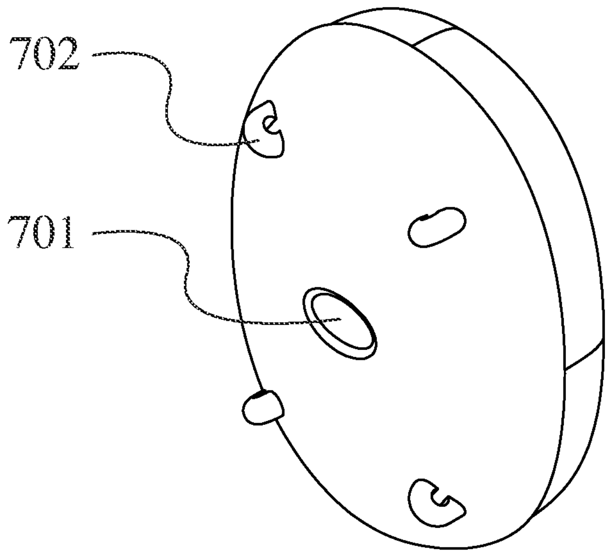
FIG. 7 is a perspective view of the exterior of an ear cup.
Figure 8:
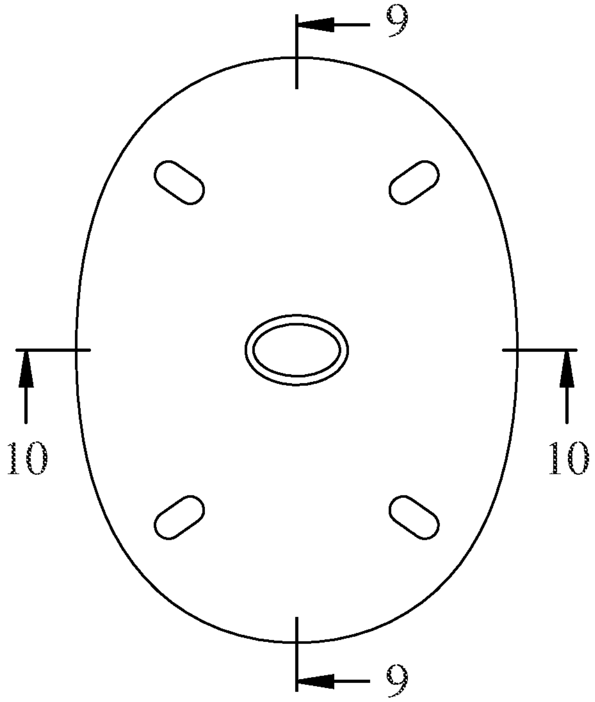
FIG. 8 is a back view of the exterior of an ear cup.

FIG. 7 shows a perspective view of the exterior of an ear cup. In one embodiment, the exterior of the cup is comprised of an ellipsoid indentation 701. This indentation provides a receptacle for an actuation mechanism. FIG. 8 shows a back view of the exterior of the ear cup.

Figure 9:
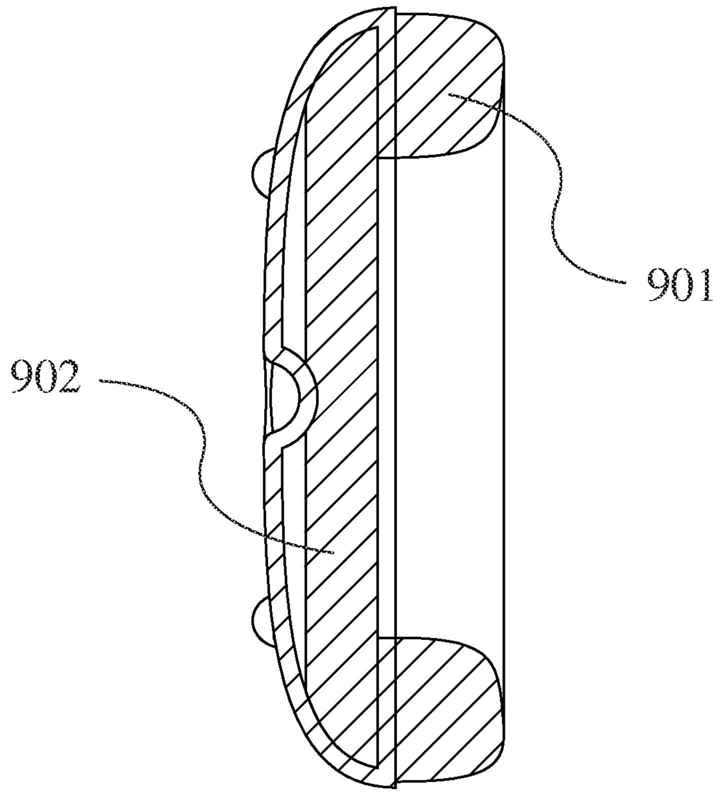
FIG. 9 is a side section cut view of an ear cup.
Figure 10:
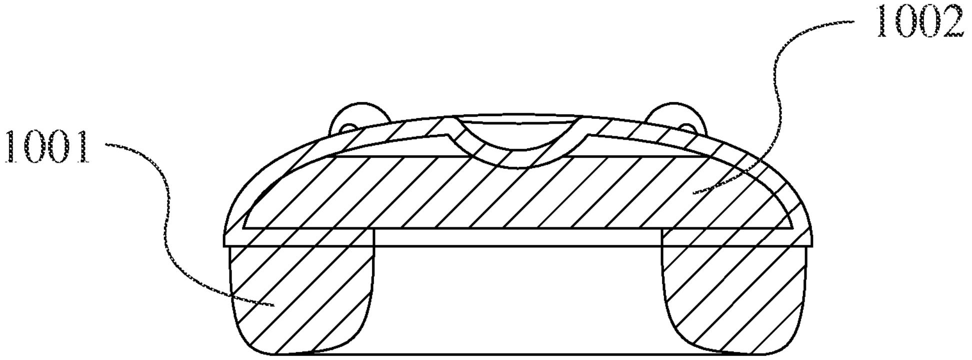
FIG. 10 is a top section cut view of an ear cup.

FIGS. 9 and 10 show side and top section cuts of an ear cup. The cup is designed to impede sound from entering the interior of the cup. The torus-shaped soft material around the rim 901, 1001 may be comprised of sound absorption material. The interior of the cup may also contain a layer of sound absorption material 902, 1002.

In some embodiments, the cup sizes are interchangeable, allowing a larger or smaller cup to be placed within the helmet, depending on the needs of the wearer.

Engaged and Disengaged Positions

The cups have engaged and disengaged positions. FIG. 4 shows one ear cup in an engaged position and one ear cup in a disengaged position. The engaged position 403 is when the ear cup is pressed securely against the wearer's head. The disengaged position 404 is when the ear cup is retracted, away from the wearer.

The wearer utilizes the engaged position when the helmet is on, and desires protection from external noise. The wearer utilizes the disengaged position when putting on or removing the helmet. The disengaged position allows the helmet to move easily past the wearer's ears without rubbing them, causing discomfort or injury. In one embodiment, the ear cup moves three-eighths of an inch between the engaged and disengaged positions. In one embodiment, only the bottom of the ear cup is retracted away from the wearer. This permits the helmet to slide on and off easily, while minimizing the necessary movement between engaged and disengaged positions.

Figure 11:
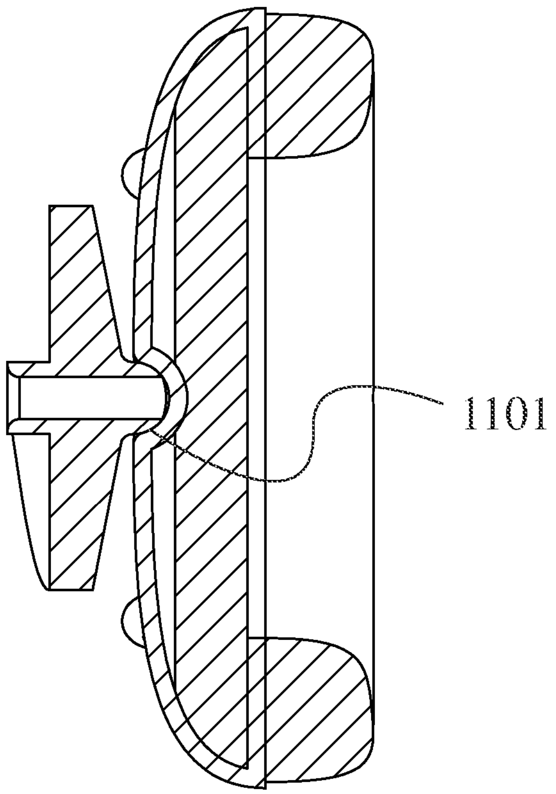
FIG. 11 is a side section cut view of an ear cup attached to a pivot.
Figure 12:
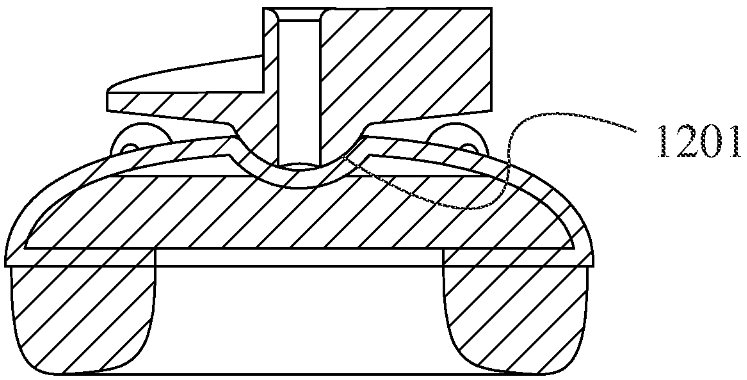
FIG. 12 is a top section cut view of an ear cup attached to a pivot.
Figure 13:
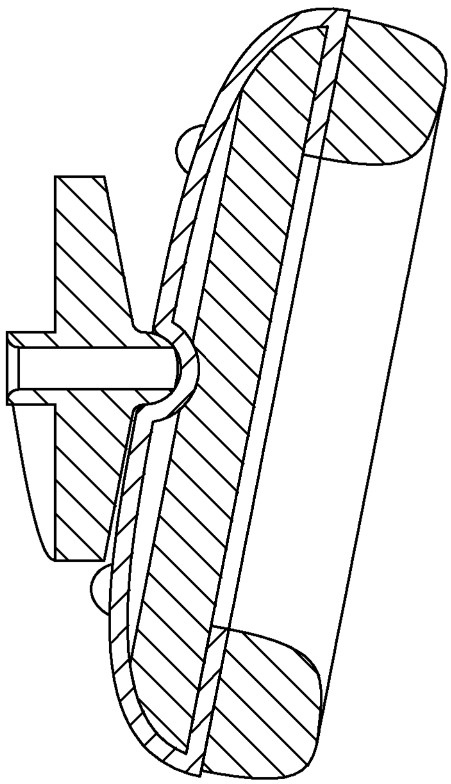
FIG. 13 is a side section cut view of an ear cup attached to a pivot and tilted down.
Figure 14:
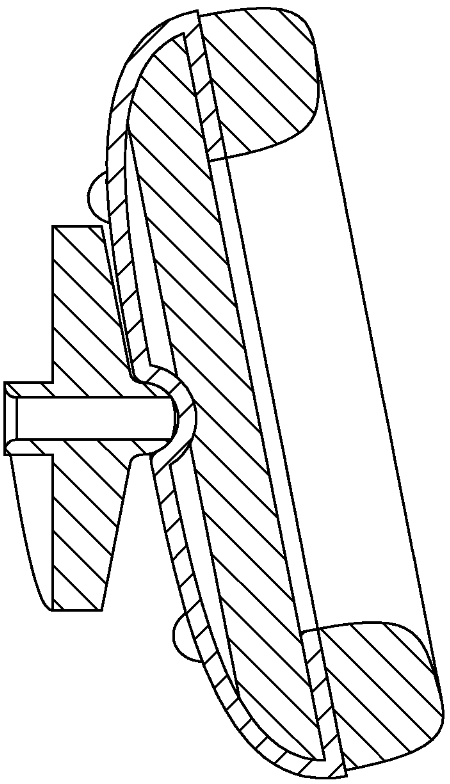
FIG. 14 is a side section cut view of an ear cup attached to a pivot and tilted up.

FIG. 11 shows a side section cut view of an ear cup with an ellipsoid pivot mechanism 1101. FIG. 12 shows a top section cut view of the ear cup with an ellipsoid pivot mechanism 1201. The ellipsoid pivot mechanism allows the ear cup to tilt in four directions: up, down, forward, and rearward. FIG. 13 shows an ear cup pivoted down, which may apply to a disengaged position. FIG. 14 shows an ear cup pivoted up, which may apply to an engaged position. The pivot capability allowed the ear cup to adjust vertical tilt to accommodate the head shape of the rider. In one embodiment, the ear cup may tilt up of down eleven degrees from the neutral position.

Figure 15:
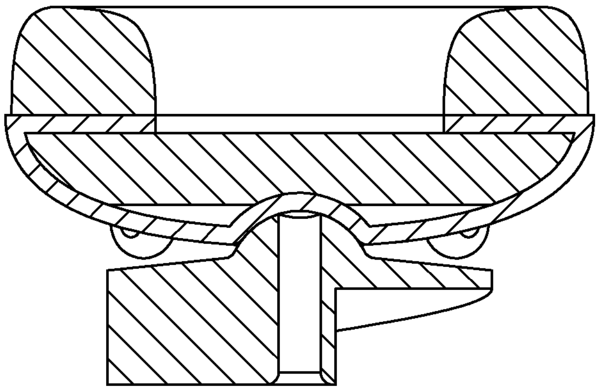
FIG. 15 is a top section cut view of an ear cup attached to a pivot.
Figure 16:
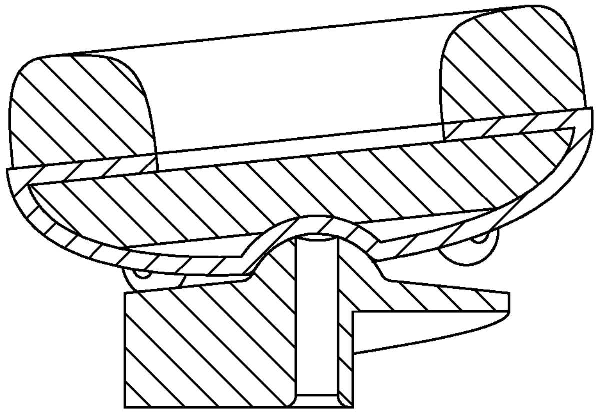
FIG. 16 is a top section cut view of an ear cup attached to a pivot and tilted forward.
Figure 17:
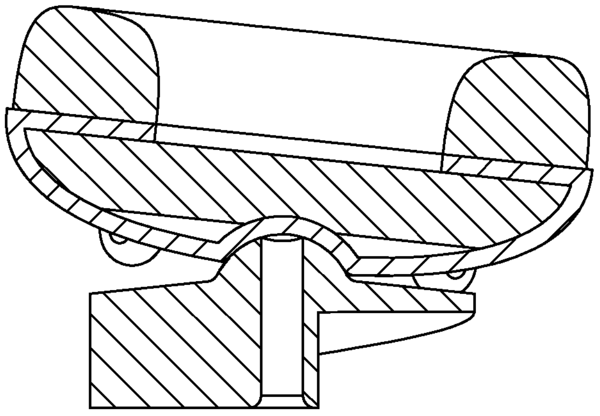
FIG. 17 is a top section cut view of an ear cup attached to a pivot and tilted rearward.

Similarly, the ellipsoid pivot mechanism allows the ear cup to pivot forward and backward, to find the perfect angle of the rider's head. FIG. 15 is a top section cut view of the ear cup and pivot mechanism in a neutral position. FIG. 16 is a top section cut view of the ear cup and pivot mechanism, with the ear cup tilted forward. FIG. 17 is a top section cut view of the ear cup and pivot mechanism, with the ear cup tilted rearward. In one embodiment, the ear cup may tilt forward or rearward six degrees from the neutral position.

The pivot mechanism is ellipsoid shaped, with the major axis on the horizontal plane and the minor axis on the vertical plane. This orientation permits greater tilting up and down, and lesser tilting forward and backward. The ellipsoid shape allows tilting but prohibits spinning. In one embodiment, the ear cups move between engaged and disengaged positions by a spinning double helix mechanism.

Double Helix Mechanism

Figure 18:
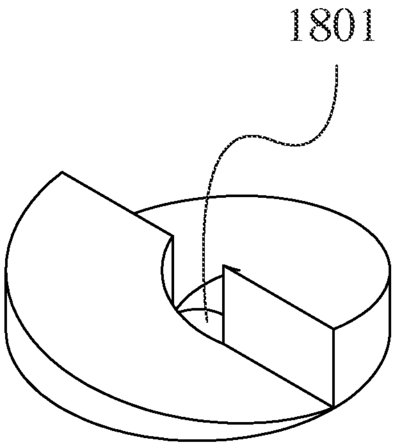
FIG. 18 is a perspective view of one half of a double helix mechanism.
Figure 19:
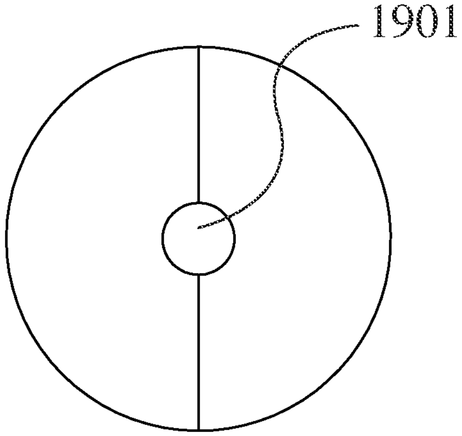
FIG. 19 is a top view of one half of a double helix mechanism.
Figure 20:
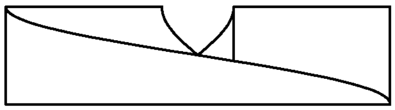
FIG. 20 is a side view of one half of a double helix mechanism.
Figure 21:
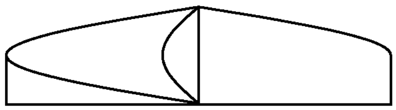
FIG. 21 is a front view of one half of a double helix mechanism.

In one embodiment, a double helix mechanism moves the ear cup towards and away from the head. The double helix mechanism is comprised of two parts. Each part is comprised of two spiral ramps. FIG. 18 shows one half of the double helix. FIG. 19 is a top view of one half of the double helix. A hole 1801, 1901 in the center provides access to a stabilizing shaft. FIG. 20 shows a side view of one half of a double helix mechanism. FIG. 21 is a front view of one half of a double helix mechanism.

Figure 22:
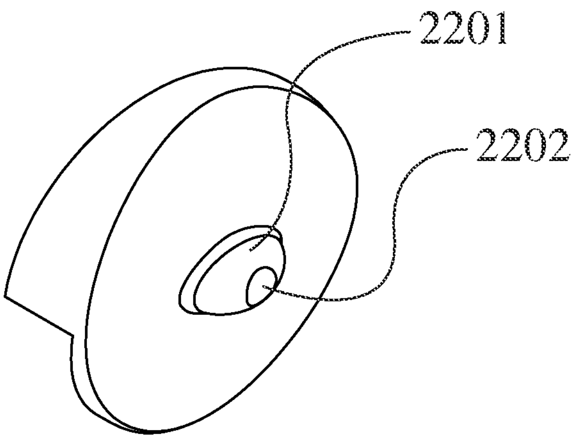
FIG. 22 is a perspective view of one half of a double helix mechanism with an ellipsoid pivot.
Figure 23:
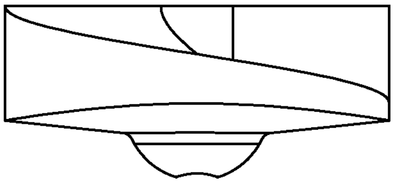
FIG. 23 is a top view of one half of a double helix mechanism with an ellipsoid pivot.
Figure 24:
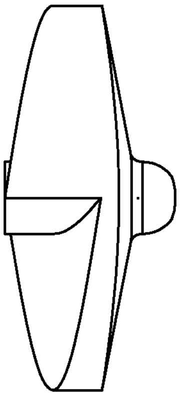
FIG. 24 is a side view of one half of a double helix mechanism with an ellipsoid pivot.
Figure 25:
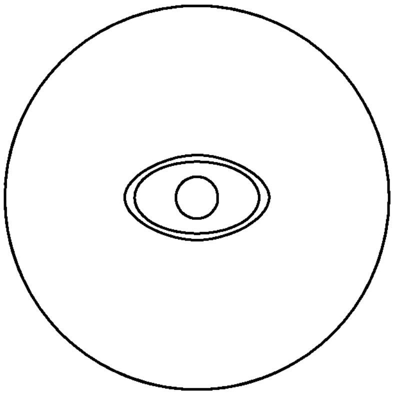
FIG. 25 is a front view of one half of a double helix mechanism with an ellipsoid pivot.

FIG. 22 shows a perspective view of the other half of the double helix mechanism. An ellipsoid protrusion 2201 extends out from the center of the base. The protrusion includes a hole 2202 through the center for the stabilizing shaft. FIG. 23 shows a top view of the half of a double helix mechanism with an ellipsoid pivot. FIG. 24 shows a side view of the half of a double helix mechanism with an ellipsoid pivot. FIG. 25 shows a front view of the half of a double helix mechanism with an ellipsoid pivot.

Figure 26:
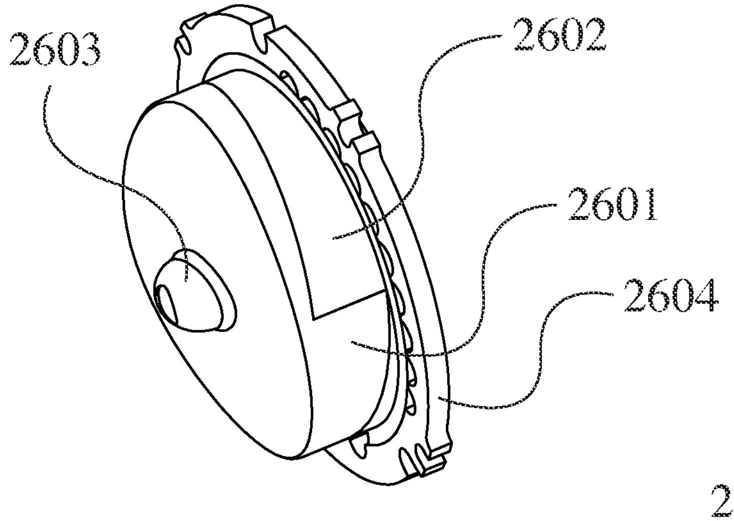
FIG. 26 is a perspective view of two halves of a double helix mechanism, fully integrated in the disengaged position.

FIG. 26 shows two halves 2601, 2602 of the double helix mechanism fully integrated. The ellipsoid protrusion 2603 on the base of one half will be inserted into the ellipsoid indentation 701 of an ear cup. The base of the other half is attached to a dial mechanism 2604. FIG. 26 shows the double helix in a disengaged position. The ear cup is retracted away from the head of the wearer. The exterior half of the double helix 2602 is rotated to transition from the disengaged position to the engaged position.

Figure 27:
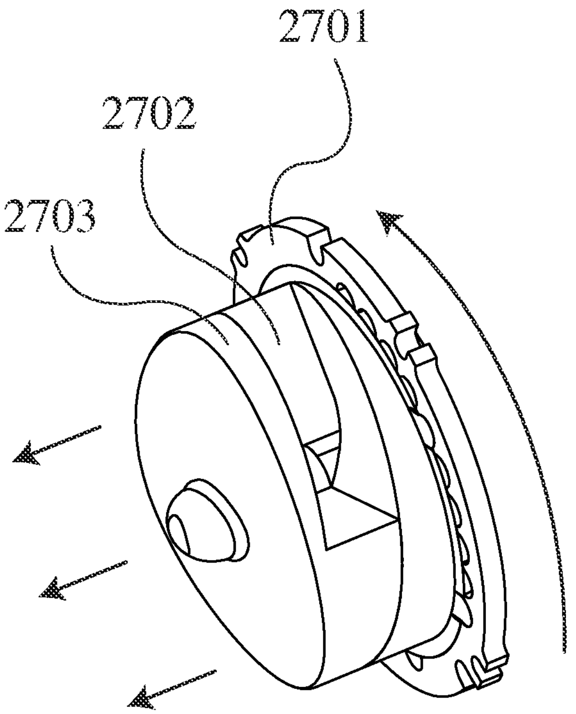
FIG. 27 is a perspective view of two halves of a double helix mechanism, transitioning between the disengaged position and the engaged position.

FIG. 27 shows the mechanism in transition between positions. As the dial 2701 is turned, the outer half 2702 of the double helix pushes against the inner half 2703. This forces the inner half to move towards the head of the wearer. The inner half remains axially stable, and only moves towards, or away from, the head. This prevents the ear cup from also turning.

Figure 28:
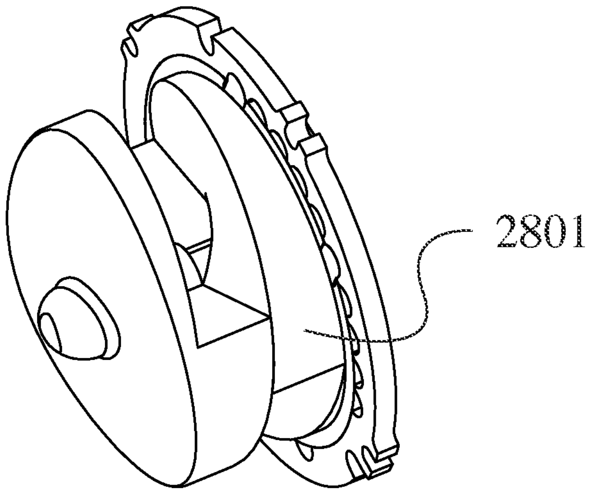
FIG. 28 is a perspective view of two halves of a double helix mechanism in the engaged position.

FIG. 28 shows the mechanism in a fully engaged position. The outer half 2801 is turned almost to the extent of the spiral ramp. For some wearers, the engaged position will require less rotation of the double helix. Transitioning back to the disengaged position requires turning the dial in the other direction.

Figure 29:
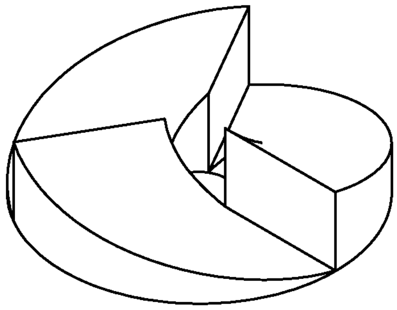
FIG. 29 is a perspective view of one half of a triple helix mechanism.
Figure 30:
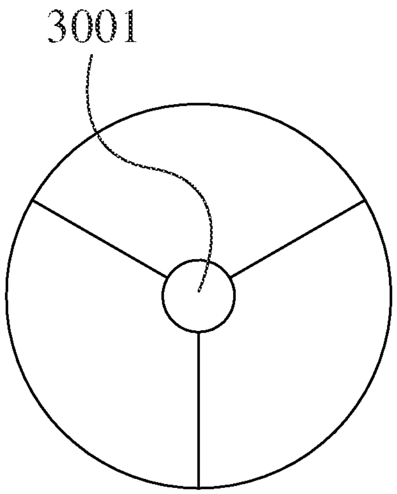
FIG. 30 is a top view of one half of a triple helix mechanism.

Other mechanisms of moving the ear cup between engaged and disengaged positions are also envisioned. In one embodiment, the mechanism is comprised of a triple helix. See FIG. 29 for a perspective view of one half of a triple helix mechanism. This embodiment includes three spiral ramps and provides more stability to the device. However, it would decrease the distance between engaged and disengaged positions. FIG. 30 shows a top view of one half of the triple helix mechanism, with a hole 3001 through the center for a stabilizing shaft.

Dial Mechanism

Figure 31:
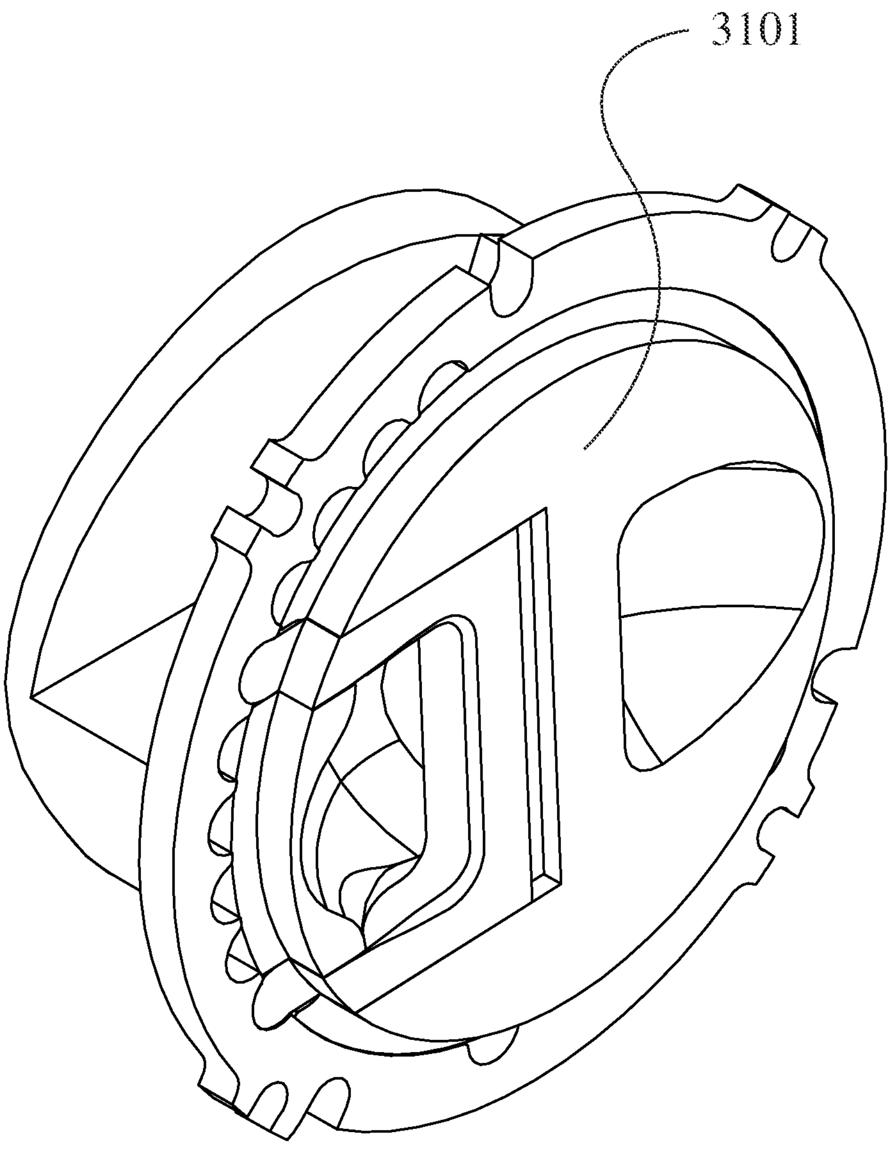
FIG. 31 is an exterior perspective view of the double helix and dial mechanism.
Figure 32:
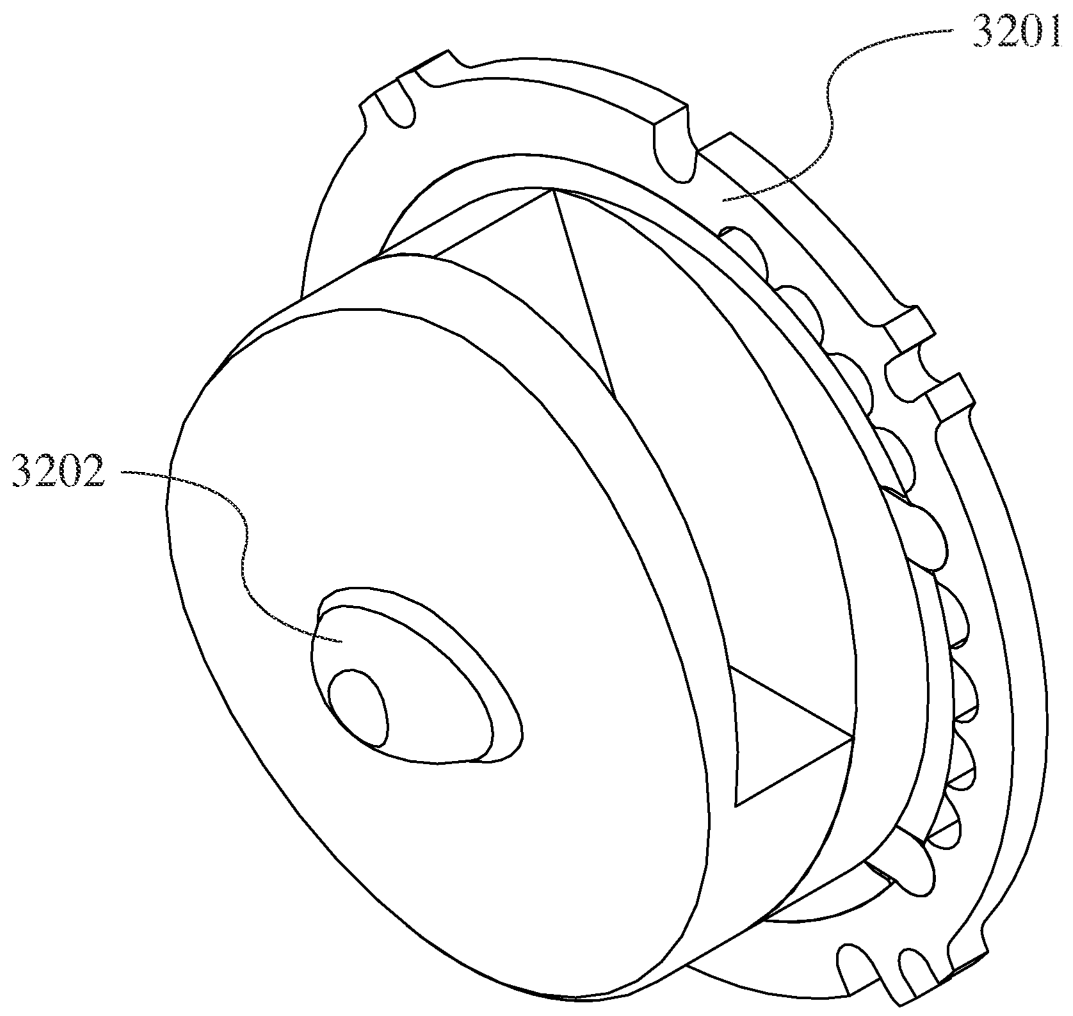
FIG. 32 is an interior perspective view of the double helix and dial mechanism.
Figure 33:
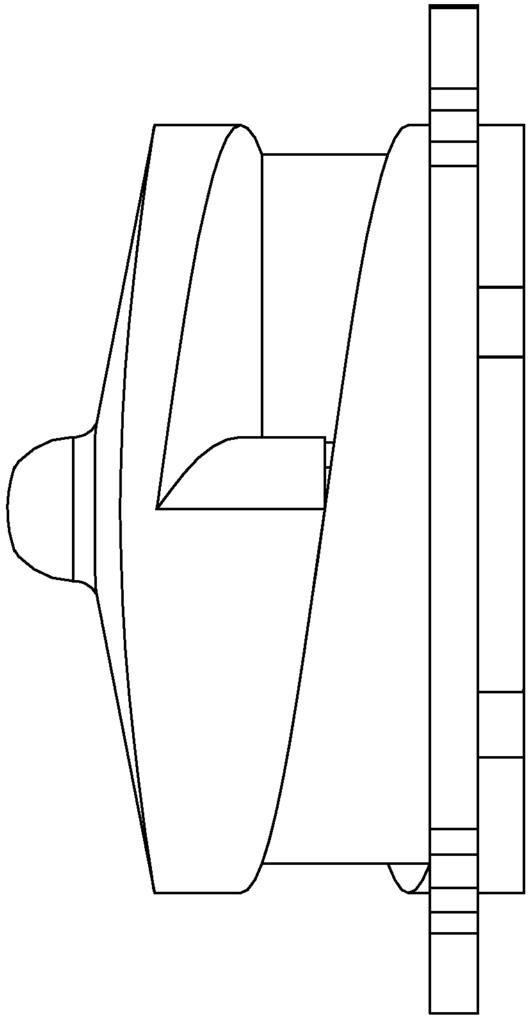
FIG. 33 is a side view of the double helix and dial mechanism.

FIG. 31 shows an exterior perspective view of the double helix mechanism connected to a dial mechanism 3101. FIG. 32 is an interior perspective view of the double helix mechanism connected to a dial 3201 and showing the ellipsoid pivot protrusion 3202. FIG. 33 shows a side view of the double helix and dial mechanisms.

Figure 34:
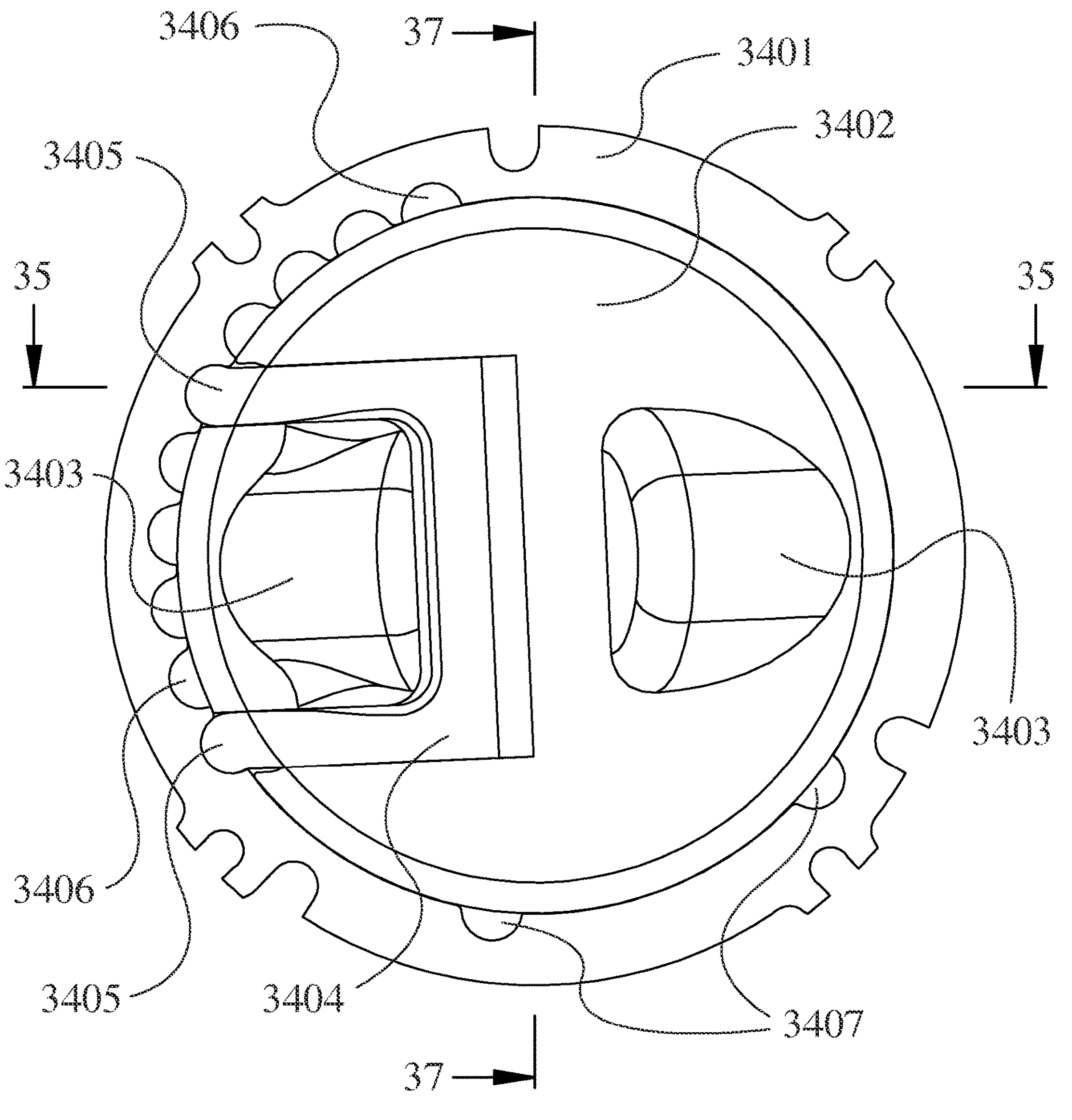
FIG. 34 is a front view of the dial mechanism.

The front of the dial is flush with the exterior shell of the helmet. See FIG. 3. The outer ring 301 is fixed to the helmet shell, while the inner parts rotate. FIG. 34 shows a front view of one embodiment of the dial mechanism from the outside. The outer ring 3401 remains static, while the inner parts 3402 rotate clockwise or counterclockwise.

The dial mechanism provides a means for rotating one half of the double helix. In one embodiment, the mechanism is controlled by two finger slots 3403. This configuration allows the wearer to adjust the helmet ear cups between engaged and disengaged positions with only one hand.

Figure 35:
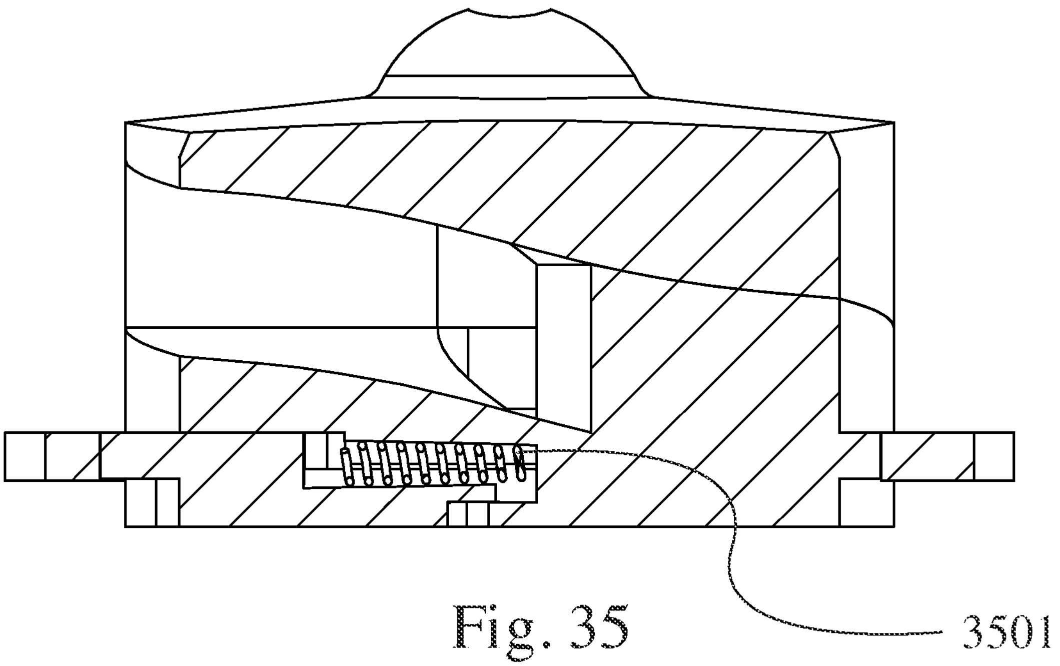
FIG. 35 is a top section cut view of the double helix and dial mechanism.

The helmet ear cups can be locked in both the engaged and disengaged positions. In one embodiment, the dial mechanism is locked by a detente device 3404. This u-shaped device moves towards the center of the dial as a wearer pinches the two finger slots. As the detente moves, it releases pins 3405 from slots 3406 in the outer ring. This release allows the dial to rotate. The teeth are positioned along the circumference of the outer ring to accommodate various engaged positions, as well as the fully disengaged position 3407. The wearer rotates the dial to the desired position and then releases the detente into the desired slots, to lock the dial in place. FIG. 35 shows a section cut view of the double helix and dial mechanism. The detente device is kept pressed into the slots by internal springs 3501. It is important that the ear cup can be locked in place during a ride to prevent movement and breaking of the seal, letting sound in. It is equally important to lock the ear cups in a disengaged position to afford the safe placement and removal of the helmet.

Figure 36:
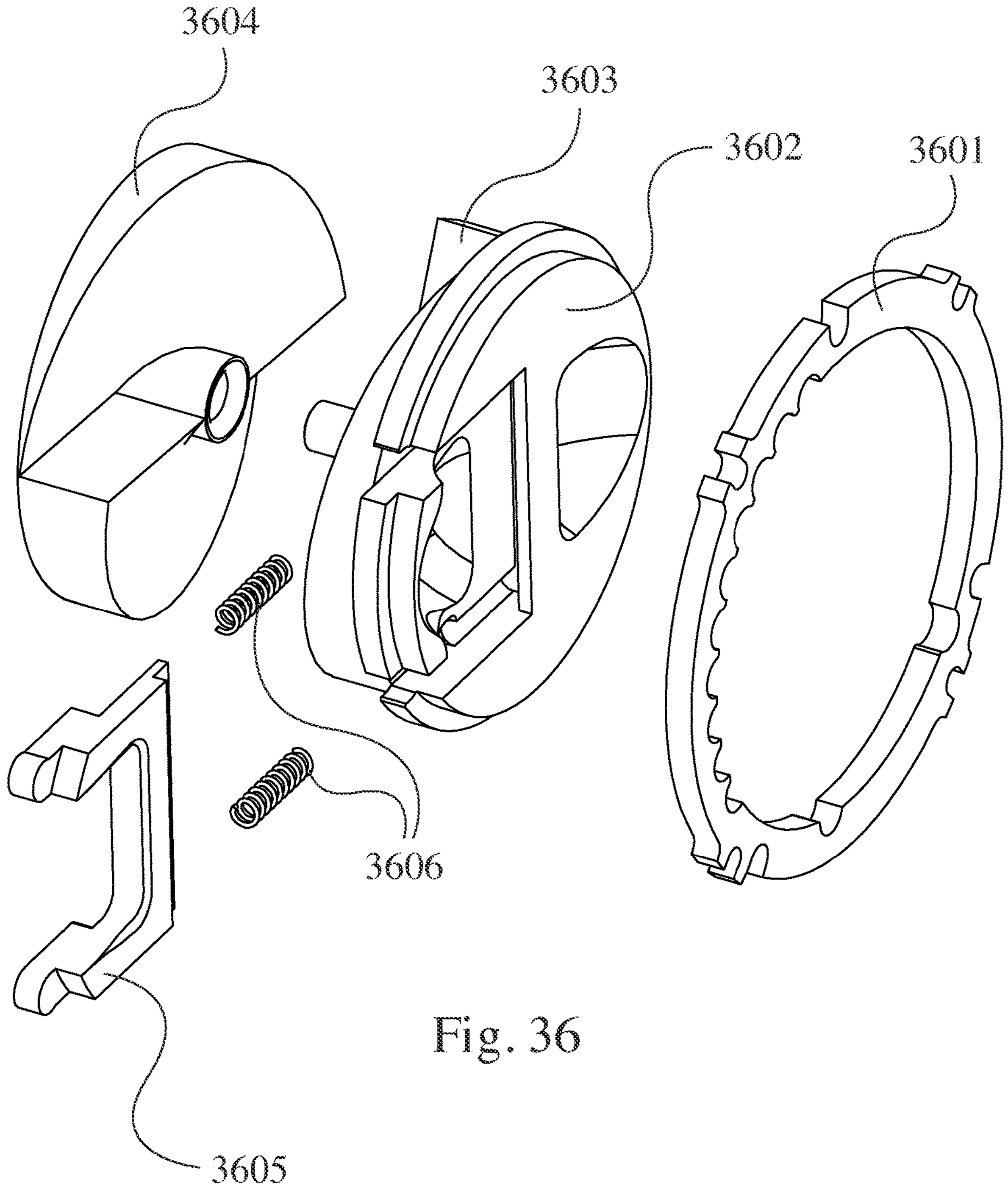
FIG. 36 is an exploded perspective view of the double helix and dial mechanism.
Figure 37:
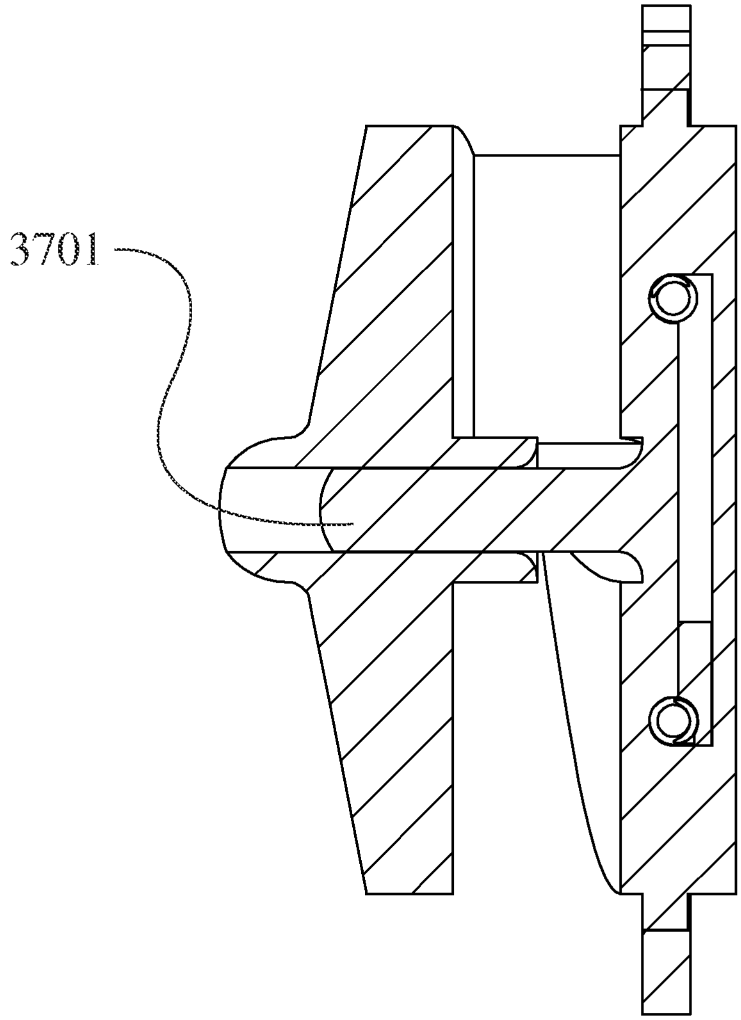
FIG. 37 is a side section cut view of the double helix and dial mechanism.

FIG. 36 shows an exploded view of the outer ring 3601, dial mechanism 3602, outer half double helix 3603, inner half double helix 3604, detente device 3605, and springs 3606. As the dial rotates, the attached outer half double helix rotates, moving the inner half double helix towards or away from the head. FIG. 37 shows a side section cut view of the double helix and dial mechanism. A stabilizing shaft 3701 ensures that the inner half double helix moves laterally.

The helmet is further comprised of a means of retracting the ear cups from the wearer's head. FIG. 4 shows one ear cup in a disengaged position 404. Springs or tension cords 405 provide a means of pulling the ear cups away from the head. The springs or tension cords are connected between the ear cups 702 and to the interior of the shell. As the ear cup is moved to the disengaged position, the tension pulls the rim of the cup away from the head.

Slider Mechanism

The helmet is comprised of a means of moving the ear cups between engaged and disengaged positions. In an alternative embodiment, the helmet includes a slider mechanism for adjusting the ear cups. This slider mechanism would take the place of the dial mechanism described above, and the outer shell would remain completely sealed around the ears.

There is one slider on each side of the helmet corresponding to the left or right ear cup. In one embodiment, the slider is placed beneath the edge of the shell on the jaw line of the neck hole. The slider will include a means for adjustment, such as a tab affording movement by the thumb and index finger of one hand. In one embodiment the tab is positioned towards the back of the helmet in the disengaged position.

A wearer will place the helmet on in the disengaged position, and then move the slider forward until the ear cup is properly tight against the wearer's head in the engaged position. In alternative embodiments, the disengaged position is towards the front of the helmet, and the engaged position is achieved by sliding the tab rearward.

The slider is capable of locking in any position along the length of the slide. In one embodiment, there are multiple slots along the length of the slide. The slider will move perpendicular to the slide to enter and exit slots. A fully disengaged slot is at one end of the slide, whereas the engaged slot will be somewhere along the length of the slide according to the wearer's size and comfort.

The helmet is comprised of a means of translating the motion of the slide to the adjustment of the ear cups. In one embodiment, the slide mechanism is connected to a flat gear which interacts with a ring gear around the outer half of the double helix mechanism. As the slide moves from disengaged position to engaged position, the outer half of the double helix rotates, pressing the other half of the double helix towards the wearer's head. As the slide moves from the engaged position to the disengaged position, the double helix rotates the opposite direction, allowing the other double helix to retract away from the wearer's head.

In an alternative embodiment, the slider is connected to a flexible cord connected to the outer half of the double helix. A spring draws the outer half of the double helix into the disengaged position. The cord is wound around the outer half of the double helix. As the slider moves towards the engaged position it unwinds, rotating the double helix and pressing the ear cup against the wearer's head. As the slider moves to the disengaged position, the spring winds the cord and pulls the ear cup away from the wearer's head.

Orthogonal Plane Movements

Alternative embodiments also include a means of adjusting fit laterally along the plan of the side of the wearer's head. The cups may move up, down, forward, and backward, to ensure the proper location of the cup around the wearer's ears. Every head is different, and the adjustability allows a single helmet to accommodate a wide range of users.

Electronics

Some embodiments of the helmet further contain electronic audio capabilities, including noise dampening, noise cancellation, and communications, while allowing ambient noise to be heard. Embodiments with electronic audio capabilities are further comprised of audio inputs and outputs, as well as necessary processors, memory, and power sources. The power source may be a battery in or on the helmet or a connection to a source outside the helmet. Alternative embodiments may also be equipped with wireless communications transceivers and receivers for Bluetooth, WIFI, or other mesh communications protocols. Audio inputs and outputs may include analog or digital connections, as well as microphones and speakers.

For an active noise cancelling feature, the interior of the cup is further comprised of at least one microphone and at least one speaker. The microphone receives a sound signal from the ambient noise inside the ear cup and translates that signal into a noise cancelling signal, which is then emitted from the speaker. Audio from a desired external source, such as communications from a telephone or another helmet wearer, is not cancelled.

Some embodiments are also further comprised of audio input and output capabilities. An example communications system is the Sena helmet system, providing communications between fellow motorcycle riders. In one embodiment, an additional microphone is placed in the interior of the helmet outside of the ear cup, for receiving sound from the helmet wearer's voice. Alternative means of picking up voice are envisioned. Speakers are placed inside the ear cups for emitting audio from telephone calls or other helmet wearers.

Some embodiments may further be equipped with an external microphone, capable of picking up audio outside the helmet. The helmet wearer may desire to hear external sounds for a variety of reasons, including safety, such as hearing sirens, pedestrians, or other vehicles. An external microphone will receive an audio signal, which is then modulated for frequency and volume before emitting through an internal speaker inside the ear cup.

CONCLUSION

While there have been shown and described illustrative examples of a helmet with a sound management mechanism, it is to be understood that various other adaptations and modifications may be made within the spirit and scope of the embodiments herein. Thus, while the foregoing description has been directed to specific embodiments, it will be apparent that other variations and modifications may be made to the described embodiments, with the attainment of some or all their advantages. Accordingly, this description is to be taken only by way of example and not to otherwise limit the scope of the embodiments herein.

What is claimed is:

1. A helmet providing sound protection to a wearer, comprising:

a) a hard exterior shell, b) one left ear cup and one right ear cup inside the shell, wherein each ear cup is configured to completely surround the ear of the wearer and form a seal against the head of the wearer, each ear cup is in the engaged position when positioned against the head of the wearer, and each ear cup is in the disengaged position when retracted away from the head of the wearer, and c) one left dial mechanism on the left exterior of the shell which controls the position of the left ear cup, and d) one right dial mechanism on the right exterior of the shell which controls the position of the right ear cup.

2. The helmet of claim 1, wherein the one left dial mechanism and the one right dial mechanism are each attached to a double helix mechanism comprised of two parts, each part is comprised of two spiral ramp surfaces, one part is the inside half, and the other part is the outside half.

3. The helmet of claim 2, wherein the outside half rotates while the inside half moves orthogonally to the axis of rotation.

4. The helmet of claim 1, wherein the one left dial mechanism and the one right dial mechanism are each attached to a triple helix mechanism comprised of two parts, each part is comprised of three spiral ramp surfaces, one part is the inside half, and the other part is the outside half.

5. The helmet of claim 1, wherein each dial mechanism is configured to operate with one hand of the wearer.

6. The helmet of claim 1, wherein each dial mechanism is operated by finger slots within a rotating portion of the dial.

7. The helmet of claim 6, further comprising a detente mechanism incorporated into a finger slot in each dial mechanism for locking each ear cup in the engaged position and the disengaged position.

8. The helmet of claim 1, wherein the one left dial mechanism and the one right dial mechanism are configured to lock the left and right ear cups in the engaged position and the disengaged position.

9. The helmet of claim 1, wherein each dial mechanism is configured to adjust the tightness of each ear cup in the engaged position against the head of the wearer.

10. The helmet of claim 1, wherein each ear cup is configured to tilt up and down.

11. The helmet of claim 10, wherein each ear cup is tilted up in the disengaged position, allowing the putting on or taking off the helmet without rubbing against the wearer's ears.

12. The helmet of claim 1, wherein each ear cup is comprised of an ellipsoid protrusion for tilting the earcups up, down, left, and right, without allowing rotational movement.

13. A helmet providing sound protection to a wearer, comprising:

a) a hard exterior shell, b) one left ear cup and one right ear cup inside the shell, wherein each ear cup is configured to completely surround the ear of the wearer and form a seal against the head of the wearer, each ear cup is in the engaged position when positioned against the head of the wearer, and each ear cup is in the disengaged position when it is retracted away from the head of the wearer, and c) one left slider mechanism under a left side edge of the shell on a jaw line which controls the position of the left ear cup, and d) one right slider mechanism under a right side edge of the shell on the jaw line which controls the position of the right ear cup.

14. The helmet of claim 13, wherein the one left slider mechanism and the one right slider mechanism are each attached to a double helix mechanism comprised of two parts, each part is comprised of two spiral ramp surfaces, one part is the inside half, and the other part is the outside half.

15. The helmet of claim 14, wherein the outside half rotates while the inside half moves orthogonally to the axis of rotation.

16. The helmet of claim 13, wherein the means one left slider mechanism and the one right slider mechanism are each attached to a triple helix mechanism comprised of two parts, each part is comprised of three spiral ramp surfaces, one part is the inside half, and the other part is the outside half.

17. The helmet of claim 13, wherein each slider mechanism is configured to operate with one hand of the wearer.

18. The helmet of claim 13, further comprising multiple slots along each side of the slider mechanism for locking each ear cup in the engaged or disengaged position.

19. The helmet of claim 13, wherein each ear cup is configured to tilt up and down.

20. The helmet of claim 19, wherein each ear cup is tilted up in the disengaged position, allowing the putting on or taking off the helmet without rubbing against the wearer's ears.

* * * * *